Nov. 17, 1925.
J. TASEFF
HANGER FOR SUSPENDED CEILINGS
Filed June 23, 1925　　2 Sheets-Sheet 1
1,561,755
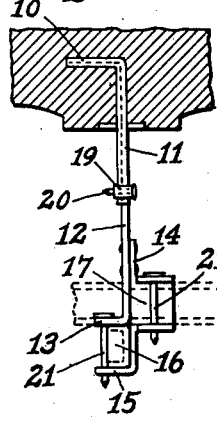
Fig.1.
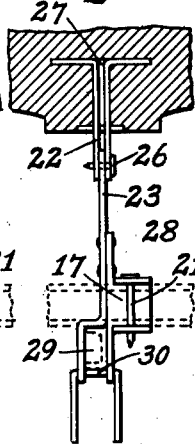
Fig.2.
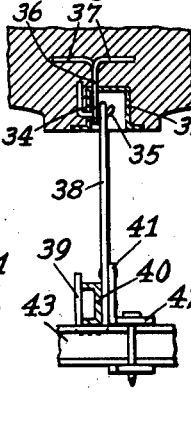
Fig.3.
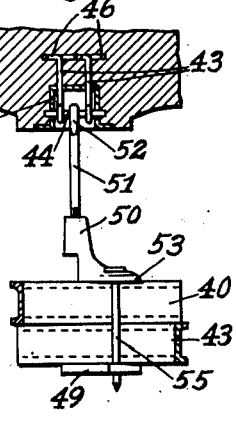
Fig.4.
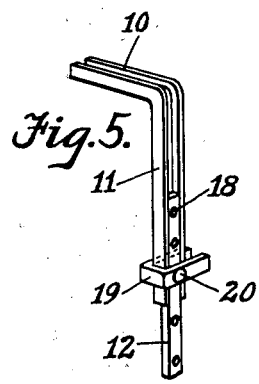
Fig.5.
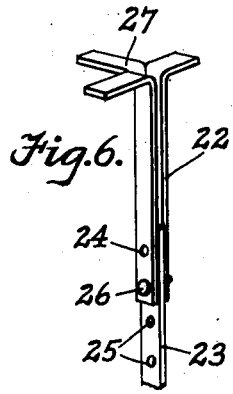
Fig.6.
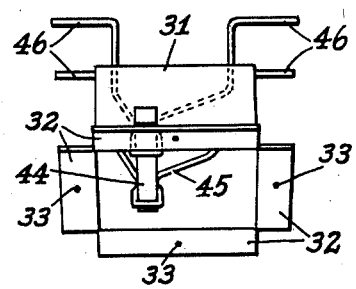
Fig.7.
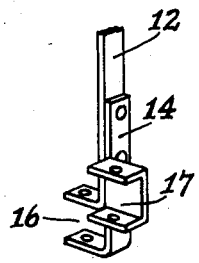
Fig.8.
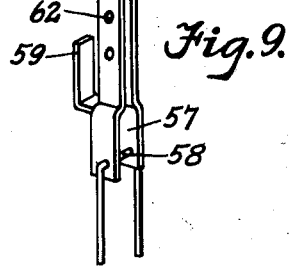
Fig.9.
Fig.10.
INVENTOR,
John Taseff
BY
ATTORNEY.

Nov. 17, 1925.
J. TASEFF
1,561,755
HANGER FOR SUSPENDED CEILINGS
Filed June 23, 1925     2 Sheets-Sheet 2
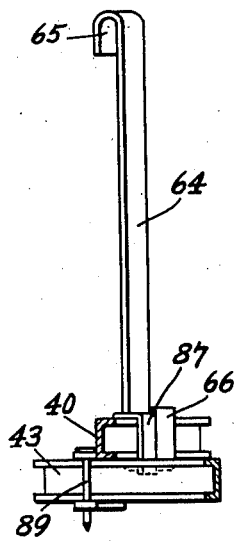
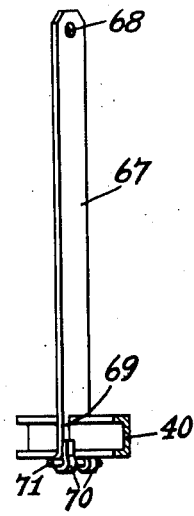
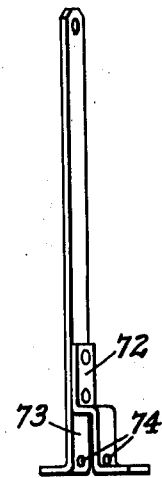
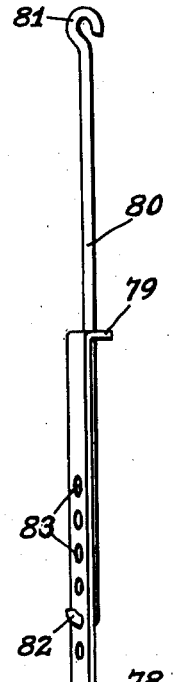
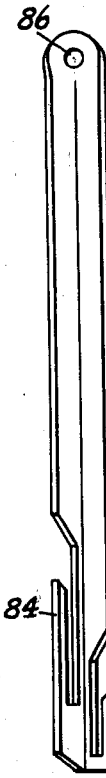
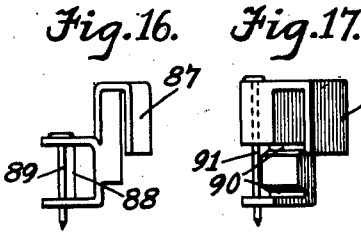
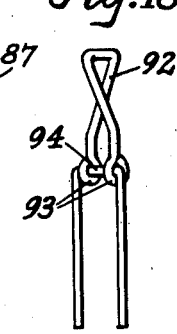
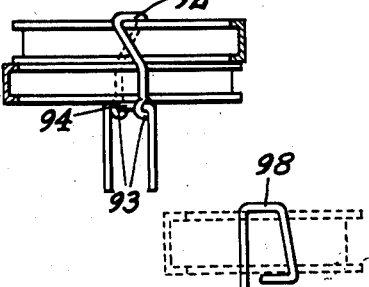
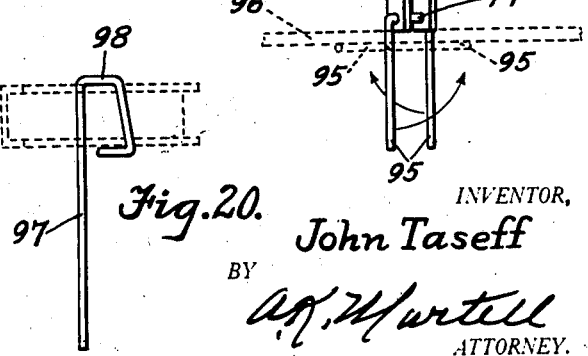
INVENTOR,
John Taseff
BY
ATTORNEY.

Patented Nov. 17, 1925.

1,561,755

UNITED STATES PATENT OFFICE.

JOHN TASEFF, OF LOS ANGELES, CALIFORNIA.

HANGER FOR SUSPENDED CEILINGS.

Application filed June 23, 1925. Serial No. 39,008.

*To all whom it may concern:*

Be it known that I, JOHN TASEFF, a citizen of the United States, residing at Los Angeles, in the county of Los Angeles, State of California, have invented new and useful Improvements in Hangers for Suspended Ceilings, of which the following is a specification.

My invention relates to hangers and fastening means for suspended ceilings, such as are used in modern buildings where cement or concrete construction is employed.

The primary object of my invention is to provide improved hangers for suspended ceilings which will prevent the sagging and cracking of such ceilings.

Another object is to provide ceiling hangers which will be inexpensive to make and which can be applied quickly and easily thus minimizing the cost of construction.

Other objects and advantages will appear hereinafter and while I show herewith and will describe a preferred form of construction, I desire it to be understood that I do not limit myself to such preferred form but that various changes and adaptations may be made therein without departing from the spirit of my invention as hereinafter claimed.

Referring to the drawings which accompany this specification and form a part thereof:

Fig. 1, is a side view of one form of my ceiling hanger, with the channel-iron frame-work supported thereby indicated in dotted lines.

Fig. 2, is a similar view of a modified form of my ceiling hanger.

Figs. 3, and 4, are similar views of further modified forms of my ceiling hangers in which the channel-iron frame-work is shown in full lines.

Fig. 5, is an enlarged view in perspective of the anchor part of the hanger shown in Fig. 1, and a portion of the holder shank, showing their adjustable features and the fastening means.

Fig. 6, is a similar view of the anchor part of the hanger shown in Fig. 2.

Fig. 7, is an enlarged view in perspective of the receptacle part of the hanger shown in Fig. 4.

Fig. 8, is an enlarged view in perspective of the holder part of the hanger shown in Fig. 1.

Fig. 9, is a similar view of a modified holder part resembling the one shown in Fig. 2.

Fig. 10, is an enlarged side view of the holder part of the hanger shown in Fig. 4.

Figs. 11, 12 and 13, are different forms of hanger parts adapted for supporting channel irons of the upper series in the ceiling frame-work, those of the lower series being supported by auxiliary hooks or clamping devices attached to the upper series.

Fig. 14, is a view in perspective of a holder part similar to that shown in Fig. 9, but having a different form of extensible shank.

Fig. 15, is view in perspective of a single-piece hanger part, made of angle iron.

Figs. 16, 17 and 18, are views in perspective of different forms of auxiliary devices for use with the hanger parts shown in Figs. 11, 12 and 13.

Fig. 19, is a fragmentary view in perspective of an upper and a lower channel iron, illustrating the use of the auxiliary supporting device shown in Fig. 18.

Fig. 20, is a view in perspective of a tie-wire for fastening the metal lath or woven wire to the channel irons of the ceiling framework.

It will readily be seen that some of the anchor parts, holder parts and auxiliary devices may be interchanged or substituted for those shown so that a considerable variation from the particular combinations illustrated is possible in adapting any preferred form to a particular use.

The hanger shown in Fig. 1 consists of an anchor piece made of shallow channel iron bent into the form of an inverted L with its short arm 10 imbedded in the cement or concrete floorwork and its longer arm 11 projecting downwardly therefrom, and a holder part made of a piece of flat bar iron with a shank 12 fitting the channel of the anchor piece and its lower end 13 bent at right angles to the shank. A plate 14 projecting below the shank and having its lower end 15 bent so as to conform with that of the shank is fixed to one side thereof so that the bent ends 13 and 15 co-operate to form a lateral and horizontally extending channel 16 adapted to receive a channel iron of the lower series in the ceiling framework. The plate is provided with a lateral extension which is cut and bent to form a second horizontal channel 17 just above channel 16, and at right angles thereto, this second channel being adapted to receive a channel iron of the upper series in the ceiling framework. Holes 18 are made in the shank 12 of the holder and similar holes which may be made to coincide therewith are provided in arm 11 of the anchor piece. A V-shaped keeper 19 having similar holes through its legs to coincide with those of shank 12 and arm 11 is slipped thereover, as shown in Fig. 5, and a nail 20 or pin is inserted through the coinciding holes of keeper, shank and anchor arm, whereby they are adjustably held in fixed relation to each other. Vertically aligned holes are made in the flanges of channels 16 and 17 to receive retaining pins 21.

The modified hanger shown in Fig. 2 consists of a similar anchor-piece and holder, except that the former is made of plate metal folded to form a deeper channel bar 22 in which the shank 23 of the holder part fits edgewise, and holes 24 and 25 are made through the channel flanges and the holder shank respectively, through which locking pins 26 are inserted as shown in Fig. 6, no keeper being necessary in this case. The anchor piece 22 is split at its upper end and the parts are bent straight angles to form a claw 27 which is imbedded in the concrete. The lower end of shank 23 and also of plate 28, which corresponds to plate 14, are modified to form a vertical fork or channel 29, open below into which a lower series channel iron may be inserted so as to be retained therein by a wire 30 extending through holes in the flanges of the vertical channel and bent downwardly with its ends projecting far enough below to serve as tie-wires for fastening the metal lath or woven wire when it is applied to the angle irons.

The hangers shown in Figs. 4 and 5 are similar in that they have a receptacle, of the general form shown in Fig. 7, fixed in the concrete floorwork instead of the anchor pieces shown in Figs. 1 and 2. This receptacle consists of an inverted sheet metal box 31 having marginal flanges 32 with perforations 33 through which nails are driven into the forms to hold it in place while the concrete is being poured. The receptacle shown in Fig. 3 is anchored in the concrete by a bent bar 34 extending through one of its walls, and terminating in an up-turned hook 35, which projects toward its center, and an anchor wire 36 looped around hook 35 with its ends projecting through the top of the receptacle, said ends being bent to form anchor pins 37. The shank 38 of the holder part of this hanger is provided at its upper end with an aperture or eye which engages hook 35 and at its lower end with an up-turned hook 39 in which an upper series channel iron 40 rests. A plate 41 having a forked extension 42 at right angles to hook 39 which is adapted to receive a lower series channel iron 43, is riveted to shank 38.

The receptacle shown in Fig. 4 is provided with a cross-bar 44 extending through opposite walls thereof and is anchored in the concrete by two wires 45 looped around said bar within the receptacle walls with their ends projecting through the top of the receptacle and bent to form anchor pins 46. The holder part of this hanger, clearly shown in Fig. 10, is a casting with grooves 47 to receive the flanges of a lower series angle iron and grooves 48 at right angles to grooves 47 to receive the flanges of an upper series angle iron. The lower end of this casting has a horizontal flange 49 and the upper end terminates in a sleeve 50 internally threaded to receive a screw-threaded shank 51, the upper end of which terminates in a hook 52 adapted to engage cross-bar 44. A laterally projecting lug 53 is formed on the holder casting just above grooves 48 and vertically aligned apertures 54 are provided in said lug 53 and flange 49 to receive a retaining pin 55 which securely holds the channel irons of both the upper and lower series in place.

A modified holder part for a hanger is shown in Fig. 9. This, like the anchor piece shown in Fig. 6, is formed of plate metal folded to form a relatively deep channel-bar 56. The flanges are split from the web of the channel bar at its lower end and are bent to form a fork 57 adapted to receive one of the lower series channel irons 43 which is held therein by a wire 58 extending through holes in the lower ends of the fork and having its ends bent downwardly to form tie-wires. The web portion of the channel bar is bent into an up-turned hook 59 adapted to receive one of the upper series angle irons 40. A shank-bar 60 of a size to slidably fit in the channel of bar 56 is adjustably held therein by a pin 61 which extends through coinciding holes 62 and 63 in the shank bar and channel bar respectively.

Figs. 11, 12 and 13 show hanger parts for holding channel irons of the upper series only, of a ceiling framework, those of the lower series being supported by auxiliary devices attached thereto. In Fig. 11 the hanger part is a flat bar 64 having a hook 65 on its upper end adapted to engage the bar 44 of the receptacle shown in Fig. 7 and an upturned hook 66 on its lower end adapted to receive one of the channel irons 40. Channel irons 43 may be attached thereto and supported thereon by one of the devices shown in Figs. 16, 17 or 18.

The hanger part shown in Fig. 12 is a straight and relatively wide piece of bar metal 67 having an aperture 68 adapted to receive a hook, such as hook 35 in Fig. 3, and having its lower end slotted to form a fork 69 adapted to receive a channel iron 40, the ends of the fork being bent into loops 70 through which a pin 71 may be inserted to hold the channel iron in place. The hanger part shown in Fig. 13 is similar to that in Fig. 12 except that it is made of narrower bar metal and an extra piece 72 bent to form a fork 73 therewith is riveted to the lower end thereof, holes 74 being provided therein for a retaining pin.

Fig. 14 shows a hanger part with a hook 75, fork 76 and retaining wire 77 similar to those shown in Fig. 9, but with a modified shank. The shank piece 78 made of flat bar metal is bent at its upper end to form a lug 79 at right angles thereto. An aperture is made in this lug and a rod 80 with a hook 81 on its upper end is slidably mounted therein, its lower end being bent at right angles and slightly hooked as at 82 to engage holes 83 in shank 78, whereby it may be adjusted to different lengths.

Fig. 15 shows a simple and substantial form of hanger part made of angle iron, parts being cut out of the flanges at its lower end to form hooks 84 and 85 adapted to receive channel irons 40 and 43 respectively. An aperture 86 is made in its upper end to receive a hook.

The auxiliary hanger parts shown in Figs. 16 and 17 are cast parts having hooks 87 adapted to hook over an upper series bar 40. The one shown in Fig. 16 has a lateral fork 88 with a retaining pin 89 to hold a bar 43 of the lower series. Its use is illustrated in Fig. 11. The one shown in Fig. 17 has grooves 90 adapted to receive the flanges of a bar 43 of the lower series and a retaining pin 91 to hold it in place.

The auxiliary hanger part shown in Fig. 18 is made of wire bent to form a clamp 92 which is adapted to embrace bars of both the upper and lower series, as illustrated in Fig. 19. The lower ends of the clamp are looped as at 93 to receive a tie-wire 94 which serves the double purpose of closing the clamp and fastening the metal lath when applied.

The use of the various tie wires referred to, in fastening the metal lath or woven wire to the hangers, is illustrated in Fig. 14, the downwardly extending ends 95 thereof, which project through the metal lath 96, being bent upwardly, as indicated by the arrows, and, if necessary, being twisted together to form a tightly closed loop. Auxiliary tie-wires 97, having their upper ends bent to form an open loop 98, which may readily be slipped over the channel irons, as shown in Fig. 20, are used to fasten the metal lath, at necessary points between hangers.

Having thus illustrated and described my invention, I claim:

1. A hanger for suspended ceilings comprising an anchor member adapted to be imbedded in the concrete floorwork of a building so as to project therebelow, a suspending member adjustably attached to said anchor member, bifurcated holders formed on the lower end of said suspending member, said holders being adapted to receive the crossbars of a ceiling framework, retaining pins in said bifurcated holders for holding the crossbars therein and for fastening metal lath or like material to the suspending member.

2. A hanger for suspended ceilings comprising an anchor member adapted to be fixed in the floorwork of a building so as to project therebelow, a suspending member adjustably attached to said anchor member bifurcated holders formed on the lower end of said suspending member for receiving the horizontal bars of the ceiling framework, pins in said bifurcated holders for retaining said horizontal bars therein and auxiliary clamps for attaching crossbars to said horizontal bars.

3. A hanger for suspended ceilings comprising an anchor member adapted to be fixed in the floorwork of a building so as to project therebelow, a suspending member adjustably attached to said anchor member, bifurcated holders formed on the lower end of said suspending member to receive the horizontal bars of a ceiling framework, retaining pins in said bifurcated holders, auxiliary clamps for fastening crossbars to said horizontal bars and means for fastening metal lath or like material to said suspending members and crossbars.

4. In combination with floorworks in buildings, hangers for suspended ceilings comprising anchor members fixed in the floorwork so as to project therebelow, extensible suspending members attached to said anchor members, two bifurcated holders formed on the lower end of said suspending members, one above the other and at right angles thereto, said bifurcated holders being adapted to receive the crossbars of a ceiling framework; retaining pins in said bifurcated holders and fastening means for holding metal lath or like material to said suspending members and crossbars.

JOHN TASEFF.